(12) United States Patent
Zhao et al.

(10) Patent No.: US 12,405,983 B1
(45) Date of Patent: Sep. 2, 2025

(54) INTERACTING WITH ONTOLOGY-BASED DATABASES USING MACHINE LEARNING

(71) Applicant: Palantir Technologies Inc., Denver, CO (US)

(72) Inventors: Samuel Zhao, Brooklyn, NY (US); Sumedh Nikhil Shah, New York, NY (US); Donn Green, New York, NY (US); Alexander Morgan, New York, NY (US); Joshua Eimer, New York, NY (US); Maya Choudhury, Winter Park, FL (US); Raj Narayan, New York, NY (US); Sidney Packer, Jersey City, NJ (US); Amrit Krishnan, New York, NY (US); Jake Brooks, Cherry Hill, NJ (US)

(73) Assignee: Palantir Technologies Inc., Denver, CO (US)

( * ) Notice: Subject to any disclaimer, the term of this patent is extended or adjusted under 35 U.S.C. 154(b) by 0 days.

(21) Appl. No.: 18/618,661

(22) Filed: Mar. 27, 2024

Related U.S. Application Data

(60) Provisional application No. 63/559,708, filed on Feb. 29, 2024.

(51) Int. Cl.
  *G06F 16/334* (2025.01)
  *G06F 8/30* (2018.01)
(52) U.S. Cl.
  CPC .......... *G06F 16/3344* (2019.01); *G06F 8/311* (2013.01)
(58) Field of Classification Search
  CPC .............................. G06F 16/3344; G06F 8/311
  (Continued)

(56) References Cited

U.S. PATENT DOCUMENTS

| 6,266,660 B1 | 7/2001 | Liu et al. |
| 8,429,179 B1 * | 4/2013 | Mirhaji ............... G06F 16/9024 707/756 |

(Continued)

FOREIGN PATENT DOCUMENTS

| KR | 101782704 B1 | 9/2017 |
| WO | 9402903 A1 | 2/1994 |
| WO | 2017087426 A1 | 5/2017 |

OTHER PUBLICATIONS

U.S. Appl. No. 18/417,772, Notice of Allowance, Feb. 7, 2025.

(Continued)

*Primary Examiner* — Cam Linh T Nguyen
(74) *Attorney, Agent, or Firm* — Duane Morris LLP

(57) ABSTRACT

A system is programmed to train or fine-tune a large language model (LLM) for converting a user query in natural language to database queries for accessing a set of databases where data related to an ontology is stored. The set of databases includes a graph database and stores metadata and actual data of the ontology. The system is further programed to receive a specific user query exploring links between objects in the ontology and leads to updates to the ontology. The system is programmed to then execute the LLM to obtain a set of database queries, including one or more graph queries. Furthermore, the system is programmed to submit the set of databased queries to the set of databases, which implements the updates to the ontology. The system is then programmed to receive data query results and transmit them in response to the specific user query.

20 Claims, 5 Drawing Sheets

(58) Field of Classification Search
USPC .......................................................... 707/769
See application file for complete search history.

(56) References Cited

U.S. PATENT DOCUMENTS

| | | | |
|---|---|---|---|
| 9,348,880 | B1 | 5/2016 | Kramer et al. |
| 10,706,236 | B1* | 7/2020 | Platt ..................... G06F 40/253 |
| 2004/0117351 | A1 | 6/2004 | Challapalli et al. |
| 2006/0015490 | A1 | 1/2006 | Denuit et al. |
| 2012/0158639 | A1 | 6/2012 | Moore et al. |
| 2012/0254153 | A1 | 10/2012 | Abraham et al. |
| 2013/0018900 | A1 | 1/2013 | Cheng et al. |
| 2013/0246470 | A1 | 9/2013 | Price et al. |
| 2013/0262361 | A1* | 10/2013 | Arroyo ............... G06F 16/3344 706/46 |
| 2013/0339385 | A1 | 12/2013 | Abrams et al. |
| 2014/0201234 | A1 | 7/2014 | Lee et al. |
| 2014/0222777 | A1 | 8/2014 | Creamer et al. |
| 2015/0302113 | A1 | 10/2015 | Rosenberg et al. |
| 2015/0309719 | A1 | 10/2015 | Ma et al. |
| 2016/0203327 | A1 | 7/2016 | Akkiraju et al. |
| 2017/0032025 | A1* | 2/2017 | Kumar ................. G06F 16/832 |
| 2017/0046425 | A1* | 2/2017 | Tonkin ................ G06F 16/3344 |
| 2017/0364539 | A1 | 12/2017 | Jacob et al. |
| 2018/0144062 | A1 | 5/2018 | Jan |
| 2019/0213258 | A1* | 7/2019 | Bacarella .............. G06F 40/295 |
| 2020/0349197 | A1 | 11/2020 | Cohen et al. |
| 2021/0117624 | A1* | 4/2021 | Aghajanyan .......... G06F 40/284 |
| 2023/0033211 | A1* | 2/2023 | Ferreira Lima ....... G06F 40/295 |

OTHER PUBLICATIONS

Rozière et al., "Code Llama: Open Foundation Models for Code", arXiv:2308.12950v3 [cs.CL] Jan. 31, 2024, 48 pages.

Qin et al., "TOOLLLM: Facilitating Large Language Models To Master 16000+ Real-World Apis", arXiv:2307.16789v2 [cs.AI] Oct. 3, 2023, 24 pages.

QuABD Quality Architecture at Scale for Big Data, "Neo4j Data Model Features", retrieved from https://quabase.sei.cmu.edu/mediawiki/index.php?title=Neo4j_Data_Model_Features&oldid=2386, dated Jan. 27, 2015, 3 pages.

Summons to Attend Oral Proceedings Pursuant to Rule 115(1) issued Mar. 13, 2023 for European Patent Application No. 18210966.0, 7 pages.

Quamar, Abdul et al., "Natural Language Interfaces to Data", Arxiv.Org, Cornell University Library, 201 Olin Library Cornell University Ithaca, NY 14853, Dec. 26, 2022 (Dec. 26, 2022), XP091402604, DOI: 10.1561/1900000078.

Huang, Fei et al., "Kosa: KO Enhanced Salary Analytics based on Knowledge Graph and LLM Capabilities", 2023 IEEE International Conference On Data Mining Workshops (ICDMW), IEEE, Dec. 4, 2023 (Dec. 4, 2023), pp. 499-505, XP034539586, DOI: 10.1109/ICDMW60847.2023.0071.

Extended European Search Report in EP Application No. 25160749.5, dated Jun. 26, 2025, 13 pages.

\* cited by examiner

200

If the user query is related to optimizing a route, generate a database query in [designated graph query language].

If the user query is related to traversing multiple links at a time, generate a database query in [designated graph query language]. — 202

If the user query is related to examining links in aggregate across many different objects, generate a database query in [designated graph query language].

If the user query is related to determining how many objects of an object type satisfy a constraint, generate a database query in [designated relational query language]. — 204

If the user query is related to determining how a small number of object types combine to produce values, generate a database query in [designated relational query language].

If the nature of the user query is unclear, generate a database query in [designated graph query language]. — 206

FIG. 2

| NATURAL LANGUAGE OR CYPHER | NATURAL LANGUAGE OR CYPHER | NATURAL LANGUAGE OR CYPHER |
|---|---|---|
| show the ten switches connected to the most other switches — 302 | show these switches and show all of their connections: YGACFSQJ535, XUPHLHVB562, IMJXUQGB386 — 302 | show me the least utilized path between equipment XUPHLHVB3423, YGACFSQJ051 — 302 |
| Formulate Query +− Checkpoint ✓ — 306 | Formulate Query +− Checkpoint ✓ | Formulate Query +− Checkpoint ✓ |
| CYPHER TRANSLATION (AUTO TRANSLATED) | CYPHER TRANSLATION (AUTO TRANSLATED) | CYPHER TRANSLATION (AUTO TRANSLATED) |
| MATCH (s:Switch)-[r:CIRCUIT](other:Switch) WITH s, COUNT (other) as switchCount ORDER BY switchCount DESC LIMIT 10 MATCH(s)-[n:CIRCUIT] (connected) RETURN s.rid, r.rid, connected.rid — 304 | MATCH (s:Switch) WHERE s.clli11 IN ["YGACFSQJ535", "XUPHLHVB562", "IMJXUQGB386"] MATCH(s)-[r:CIRCUIT]-(connected) RETURN s.rid, r.rid, connected.rid — 304 | (from: NetworkEquipment{clli:11: "XUPHLHVB423"}), (to:NetworkEquipment{clli:11: "YGACFSQJ051"}) CALL apoc.algo.dijkstra(from,to, "CIRCUIT", "utilizationPercent") — 308 YIELD path AS path WITH relationships(path) AS rels, — 304 |

FIG. 3A     FIG. 3B     FIG. 3C

INTERACTING WITH ONTOLOGY-BASED DATABASES USING MACHINE LEARNING

BENEFIT CLAIM

This application claims the benefit under 35 U.S.C. § 119(e) of U.S. Provisional Application No. 63/559,708, titled "INTERACTING WITH ONTOLOGY-BASED DATABASES USING MACHINE LEARNING" and filed on Feb. 29, 2024, the entire contents of which are hereby incorporated by reference as if fully set forth herein.

TECHNICAL FIELD

The present disclosure relates to database interactions, and more particularly to improving human interaction with graph databases using machine learning.

BACKGROUND

Graph databases are becoming increasingly popular due to their ability to store and represent complex relationships between data points. However, querying these databases can be challenging, especially for non-technical users who are not familiar with the query language. It would be helpful to have a have a friendly, effective interface for accessing such databases and performing database tasks.

SUMMARY

The appended claims may serve as a summary of the invention.

BRIEF DESCRIPTION OF THE DRAWINGS

Example embodiments will now be described by way of non-limiting examples with reference to the accompanying drawings, in which:

FIG. 2 illustrates an example prompt for a large language model to automatically generate an appropriate database query in accordance with disclosed embodiments.

FIG. 3A illustrates one of successive screenshots of a portion of a graphical user interface (GUI) that allows entering a user query and displaying a corresponding database query in accordance with disclosed embodiments.

FIG. 3B illustrates one of successive screenshots of a portion of the GUI that allows entering a user query and displaying a corresponding database query in accordance with disclosed embodiments.

FIG. 3C illustrates one of successive screenshots of a portion of the GUI that allows entering a user query and displaying a corresponding database query in accordance with disclosed embodiments.

DETAILED DESCRIPTION OF CERTAIN EMBODIMENTS

Figure 1:
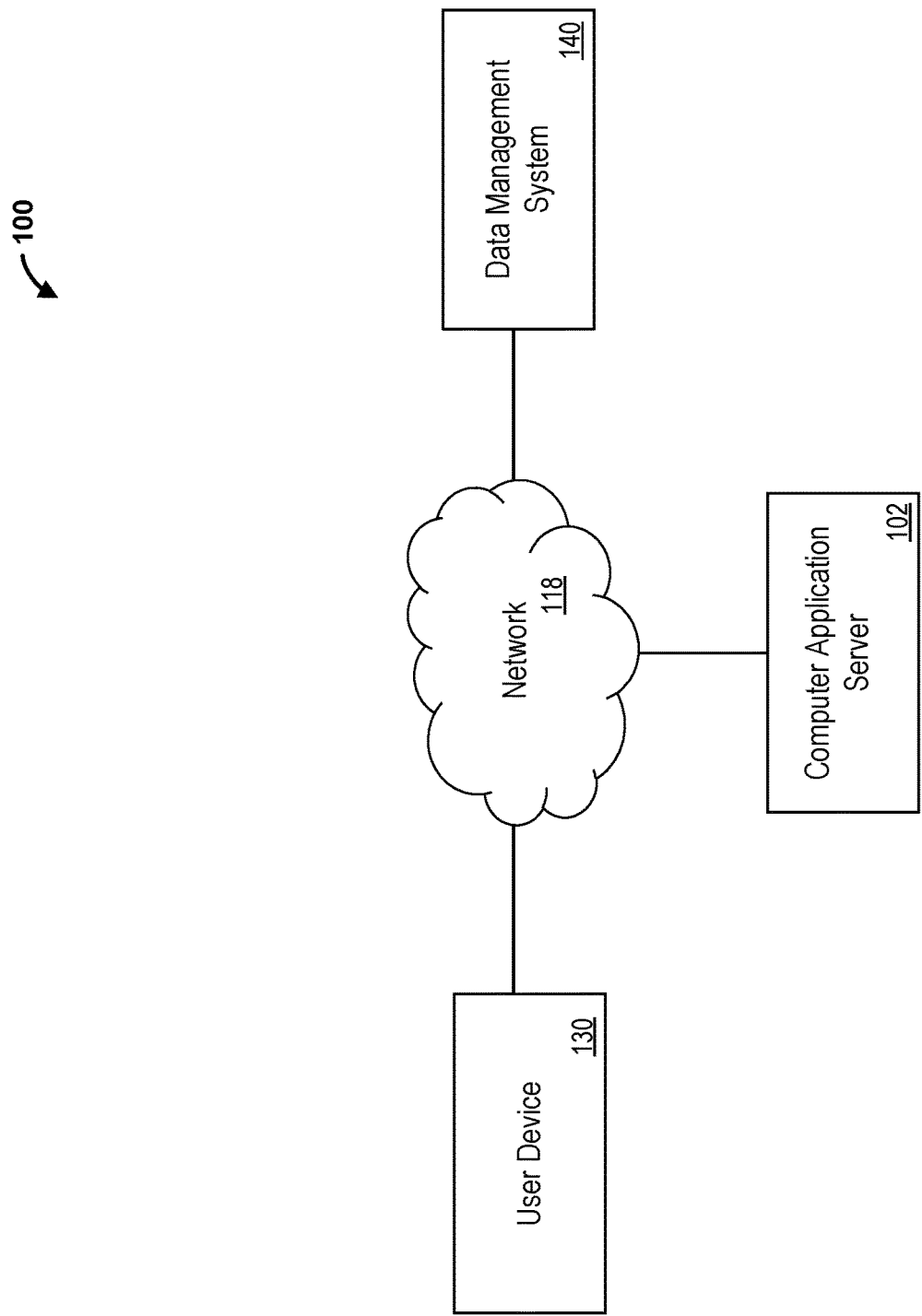
FIG. 1 illustrates an example networked computer system in which various embodiments may be practiced.

In the following description, for the purposes of explanation, numerous specific details are set forth in order to provide a thorough understanding of the example embodiment(s) of the present invention. It will be apparent, however, that the example embodiment(s) may be practiced without these specific details. In other instances, well-known structures and devices are shown in block diagram form in order to avoid unnecessarily obscuring the example embodiment(s).

1. General Overview

A system is programmed to train or fine-tune a large language model (LLM) for converting a user query in natural language to database queries for accessing a set of databases where data related to an ontology is stored. The set of databases includes a graph database and stores metadata and actual data of the ontology. The system is further programed to receive a specific user query exploring links between objects in the ontology and leads to updates to the ontology. The system is programmed to then execute the LLM to obtain a set of database queries, including one or more graph queries. Furthermore, the system is programmed to submit the set of databased queries to the set of databases, which implements the updates to the ontology. The system is then programmed to receive data query results and transmit them in response to the specific user query.

In some embodiments, the system is programmed to manage or access an ontology, which defines object types and link types and includes objects links. For example, an ontology for a communication network can define object types corresponding to switches and pieces of communication equipment and link types corresponding to circuits. Data related to the ontology is stored in various databases, including graph databases, where objects and links in the ontology can map to nodes and edges in graph data. The links could capture various relationships, such as proximities, co-occurrences, dependencies, or references.

In some embodiments, the system is programmed to train (including fine-tuning) an LLM for converting a user query related to the ontology in natural language to database queries for accessing the various databases, which can also include relational databases. The system can be programmed to further train the LLM to preferentially convert a user query to a specific type of database query. In certain embodiments, the system could be programmed to provide a prompt to the trained LLM that indicates characteristics or examples of user queries that are to be preferentially converted into a specific type of database query. Some user queries can specifically explore relationships in terms of connections, paths, or networks in the ontology, and such data is often stored in the graph databases. For example, such a user query could be related to finding a shortest path of circuits between two computers in the communication network. The trained LLM would then generally convert such a user query to at least one graph query for accessing one of the graph databases.

Certain user queries could lead to updates to the ontology, which can alter the metadata of the ontology, such as an index, a high-level map, or a running report. In certain embodiments, depending on where and how the metadata is stored, the trained LLM would then generally convert such a user query to an appropriate type of database query for accessing a database where the metadata is stored, in addition to a database query for updating data of the ontology.

The system disclosed herein has several technical benefits. By effectively training an LLM to preferentially generate a database query in one of multiple database query languages that leads to efficient database operations, the system enables a user to explore ontology-based databases in natural language and query the databases effectively. By maintaining data related to an ontology in existing graph databases or other types of databases instead of converting the data to a text form to be directly accessed by the LLM, the system maintains the precision in analyzing the data and limiting statistical uncertainty to formulating database queries. Furthermore, the organization of the databases based on the ontology allows the performance of various operations on the ontology, including making updates to actual data or metadata of the ontology. The system also offers the flexibility of generating a function call into an application programming interface (API) of the ontology, which can be executed to perform the various operations.

2. Example Computing Environments

FIG. 1 illustrates an example networked computer system in which various embodiments may be practiced. FIG. 1 is shown in simplified, schematic format for purposes of illustrating a clear example and other embodiments may include more, fewer, or different elements.

In some embodiments, a networked computer system 100 comprises a computer server ("server") 102, a user device 130, and a database management system 140, which are communicatively coupled through direct physical connections or via a network 118.

In some embodiments, the server 102 is programmed or configured to process a user query related to data stored in ontology-based databases and a corresponding database query. The user query is typically in natural language. The processing can include training and executing one or more LLMs that generate database queries, executing the LLMs using the user query as the input data, transmitting the corresponding database query as the output data from the LLMs to another device for processing, and collecting the database query result. The server 102 can comprise any centralized or distributed computing facility with sufficient computing power in data processing, data storage, and network communication for performing the above-mentioned functions. In certain embodiments, the server 102 is integrated into the user device 130.

In some embodiments, the user device 130 is programmed or configured to receive a user query related to data stored in ontology-based databases or transmit such a query to another device for processing. The query is typically in natural language. The user device 130 is also programmed to receive and present the user query result. The user device 130 can comprise a personal computing device, such as s desktop computer, laptop computer, tablet computer, smartphone, or wearable device.

In some embodiments, the database management system 140 is programmed or configured to manage ontology-based databases, such as a graph database or a relational database. The databases store data representing objects of an ontology. The management includes receiving and processing database queries in a database query language and transmitting the database query results. The database management system 140 can generally be similar to the server 102 and comprise any computing facility with sufficient computing power in data processing, data storage, and network communication for performing the above-mentioned functions.

The network 118 may be implemented by any medium or mechanism that provides for the exchange of data between the various elements of FIG. 1. Examples of the network 118 include, without limitation, one or more of a cellular network, communicatively coupled with a data connection to the computing devices over a cellular antenna, a near-field communication (NFC) network, a Local Area Network (LAN), a Wide Area Network (WAN), or the Internet, a terrestrial or satellite link.

In some embodiments, the server 102 is programmed to receive a user query in natural language from the user device 130. The user query can focus on relationships within the ontology. The server 102 is programmed to transform the user query into a graph query and transmit the graph query to the database management system 140. The server 102 is programmed to then receive the result of executing the graph query the database management system 140 and transmit information related to the result to the user device 130 in response to the user query.

3. Functional Descriptions 3.1. Translating User Queries to Database Queries

In some embodiments, the server 102 is programmed to maintain an ontology, such as one using the FOUNDRY platform. The ontology can define all relevant object types, such as people, computers, networks, communication equipment, or switches. Actual objects are instantiated from the ontology. Similar structures, such as properties, links, or versions, and similar operations, such as revision, access control, or provenance tracking at the object, property, link, row, or column level, apply to all object types. The objects and structures are all considered as data in the ontology. The ontology can support an application programming interface (API) that allows access to the objects and the structures.

In some embodiments, the server 102 is programmed to access various databases associated with the ontology. Data related to the ontology could be stored in different types of databases, which can be accessed using different database query languages. The ontology has an inherent graph structure, where objects can be mapped to nodes and relationships between the objects in terms of links could be mapped to edges in a graph database, for example. The graph database can be queried using a graph query language, such as the CYPHER or GraphQL languages. On the other hand, each object could be mapped to a row, with properties of the object corresponding to columns in a relational database, for example. The relational database can be queried using a relational query language, such as the structured query language (SQL) or query language (QUEL). In addition, the ontology can include metadata at the object, link, ontology depth, sub-ontology, ontology, or other levels, which can also be stored in the databases and accessible through database queries.

In some embodiments, the server 102 is programmed to access multiple databases concurrently in response to a user query. As an example, the user query can be converted to a graph query, which can be submitted to a graph database. The database query result can then be converted into data in a relational database. As another example, the user query can be converted to both a graph query and a relational query, which can respectively be submitted to a graph database and a relational database. The database query results can be compared or consolidated. Further information can be found in U.S. Pat. No. 11,880,409, issued on Jan. 12, 2024, for instance.

In some embodiments, given a user query in natural language, one goal is to transform the user query into multiple database queries for the various databases associated with the ontology. Another goal is to identify a database query associated with the most efficient query processing without necessarily generating multiple database queries.

In some embodiments, the server 102 is programmed to train a select LLM that accepts a query in natural language and outputs one or more corresponding database queries in one or more database query languages. This could be achieved by utilizing the approach discussed in the paper by Rozière et al. titled "Code Llama: Open Foundation Models for Code", arXiv:2308.12950v3 [cs.CL] 31 Jan. 2024, for example. The LLM discussed in the paper is already trained to convert a user query into code in one of multiple common programming languages, such as Python, C++, Java, and JavaScript. The LLM can be retrained to also support one or more database query languages. Alternatively, the LLM can be fine-tuned with prompts having training examples of converting user queries into code in the one or more database query languages.

In some embodiments, the server 102 is programmed to train the select LLM to accept a query in natural language and produce multiple database queries respectively in multiple database query languages for the various databases associated with the ontology. The training data would be similar to what was used to train the LLM discussed in the paper, where each user query is translated into corresponding, multiple database queries in multiple database query languages. The server 102 can be configured to further compare the multiple database queries and select one for execution based on one or more criteria, such as the shortest length or the least amount of nesting of the database query.

In some embodiments, the server 102 is programmed to train the select LLM to accept a query in natural language and produce one or more database queries in only one database query language, which is intended to be the one associated with the most efficient query processing. The training data would also be similar to what was used to train the LLM discussed in the paper, except that each user query is translated into corresponding, multiple database queries in only one database query language. Alternatively, the server 102 can be programmed to provide specific instructions in a prompt together with a given user query to the select LLM already trained to generate a database query in any of multiple database query languages, to guide the select LLM to generate one or more database queries corresponding to the given user query in an appropriate database query language.

FIG. 2 illustrates an example prompt for an LLM to automatically generate an appropriate database query in accordance with disclosed embodiments. For this example prompt, the LLM has been trained to generate a database query in any of multiple database query languages, including a designated graph query language and a designated relational query language. The set of instructions 200 can include a first section 202 indicating that certain user queries are translated to only graph queries, a second section 204 indicating that certain user queries are translated to only relational queries, and a third section 206 as a catch-all to guide the LLM in determining how all other user queries should be translated to database queries, depending on the nature of a user query and the nature of each type of database.

In some embodiments, the user queries that are best translated only to graph queries are characterized by looking for complex connections, paths, networks, or quantities computed over such entities. Therefore, examples of such user queries can include looking for the list of traffic accidents that occurred when multiple cars collided and the passengers in these cars are related, the shortest path between two cities, or the list of people who know this person directly or indirectly. These examples could also mention "connections", "paths", "networks", or other keywords directly. Such examples could be inserted into the first section 202 to fine-tune the LLM. For instance, "If the user query is related to optimizing a route" in the first section 202 could be extended to "If the user query is related to optimizing a route, such as 'find the shortest path between two cities'". Such examples could also be inserted into a new section prefixed by a statement that these are examples of user queries that should be translated into graph queries.

In some embodiments, the user queries that are not best translated into graph queries are generally characterized by the instructions in the second section 204. In another example prompt, the second section 204 could therefore state that "In all other cases, generate a relational query.", and the third section 206 can be omitted. Similarly, examples of such user queries could be inserted into the second section 204 or a new section prefixed by a statement that these are examples of user queries that should be translated into relational queries. It is to be appreciated that the language used in these example prompts are for illustration purposes, and variants of the language conveying the same meanings can be used to achieve the same purposes.

3.2. Presenting Database Query Results in Graphical User Interfaces that Enables Users to Create Further User Queries In some embodiments, the server 102 is programmed to create or manage a GUI that allows a user to enter a user query in natural language, view the query result graphically, and create further user queries by interacting with the query result. The server 102 can work with input/output devices directly or through a user device 130.

FIGS. 3A, 3B, and 3C illustrate successive screenshots of a portion of a GUI that allows entering a user query and displaying a corresponding database query in accordance with disclosed embodiments. In this example, the user queries explore entities and their relationships in a communication network that is modeled by an ontology, where the entities are represented as objects and relationships are represented as links in the ontology. Such entities can include switches, circuits, or pieces of communication equipment, such as modems, phones, computers, routers, or televisions. The exploration can lead to improved effectiveness of the communication network. These user queries are all translated into graph queries to be submitted to one or more graph databases. In this example, a node represents an entity in the communication network and can have one or more attributes that correspond to properties of the corresponding objects in the ontology, while an edge represents a relationship between two entities and can also have one or more attributes that correspond to properties of the corresponding links in the ontology. Results of executing the graph queries can be visualized as graphs. The result of each execution includes enough information to respond to the user query and can include additional information available in the ontology based on configurable settings.

In FIG. 3A, an initial user query is entered into the area 302. A corresponding first database query could be automatically generated based on the process described in Section 3.1. The first database query can be automatically shown in the area 304 or in response to pressing the button 306. The first database query can be automatically executed once it is generated or in response to the interaction with a certain element of the GUI. A result of the execution represented as a graph can be automatically displayed in another portion of the GUI or in response to the interaction with a specific element of the GUI. Interacting with the graph can lead to retrieving information regarding the graph components. For example, selecting a node in the graph representing a switch could lead to retrieving an identifier of the corresponding object in the ontology.

In FIG. 3B, a second user query is entered into the area 302 to drill into the result of executing the initial user query via the first database query. "YGACFSQJ535", for instance, can be the identifier of an object representing a switch in the ontology, which can be obtained by interacting with the corresponding node in the graph representing the result of executing the first database query. A corresponding second database query could be similarly generated and executed. While the result of executing first database query might show merely how relevant switches are connected with other switches, the result of executing the second database query can show how the three specified switches are connected to all other components in the communication network.

In FIG. 3C, a third user query is entered into the area 302 to drill into the result of executing the second user query via the second database query. "XUPHLHVB3424" and "YGACFSQJ051" can be identifiers of objects representing pieces of communication equipment in the ontology, which can be accessed by interacting with the corresponding nodes in the graph representing the result of executing the second database query. Specifically, each of the two pieces of communication equipment can be connected to a respective switch via a relatively large number of circuits, not all of which are fully utilized, which represents an opportunity for circuit consolidation. Finding the least utilized path between the two pieces of equipment can help identify which circuits are candidates for elimination. A corresponding third database query could be similarly generated and executed. The utilization of a path corresponds to a utilizationPercent attribute of an edge between two nodes in the graph database, as referenced by the attribute 308 in the third database query.

3.3. Updating Ontology Data in Response to User Queries

In some embodiments, the server 102 is programmed to respond to user queries that lead to updates of the ontology. For example, after finding the least utilized path between two pieces of communication equipment, a user query can instruct consolidating some of the circuits between the two pieces of communication equipment. That can lead to updating properties of certain circuit links or deleting or adding certain circuit links in the ontology. As data related to the ontology is generally stored in the various databases, a user query that leads to updates of the ontology can similarly be translated into a database query, as noted above. Such a database query can include a CREATE, DELETE, UPDATE, or a similar clause. However, besides database queries that operate on actual data of the ontology, additional database queries can be required to update metadata of the ontology especially at the ontology level, such as an index, a high-level map, or a running report. Therefore, the server 102 can be programmed to incorporate corresponding examples of such additional database queries in the prompt for an LLM that outputs code in a programming language, as discussed above, to cover updating the metadata of the ontology. The result can be that a user query that leads to updates of the ontology is translated to a combination of graph queries and relational queries. For example, the graph queries can be used to update links of the ontology, while the relational queries can be used to update an index of the ontology.

In some embodiments, the server 102 can be programmed to translate such user queries into function calls into the ontology's API, which would perform all necessary operations on the ontology, including appropriate database operations corresponding to taking actions on ontology objects.

The server 102 can be configured to identify that a user query leads to updates of the ontology based on certain keywords indicating update operations or ontology objects or using known natural language processing techniques. To translate a user query into a function call in the ontology's API, the server 102 can be programmed to train an LLM that accepts a query in natural language and outputs one or more corresponding function calls. This could similarly be achieved by utilizing the approach discussed in the paper by Rozière et al., for example, which involves including in prompts training examples of converting user queries into code conforming to the ontology's API. When it is helpful to automatically generate a series of function calls based on replies to previous function calls in the series by the API server, the server 102 can be configured to utilize the approach discussed in the paper by Qin et al. titled "TOOLLLM: FACILITATING LARGE LANGUAGE MODELS TO MASTER 16000+ REAL-WORLD APIS", arXiv:2307.16789v2 [cs.AI] 3 Oct. 2023. The server 102 can be programmed to obtain a custom ToolBench by undergoing the API Collection phase, Instruction Generation phase, and Solution Path Annotation phase, as discussed in the paper.

4. Example Processes

Figure 4:
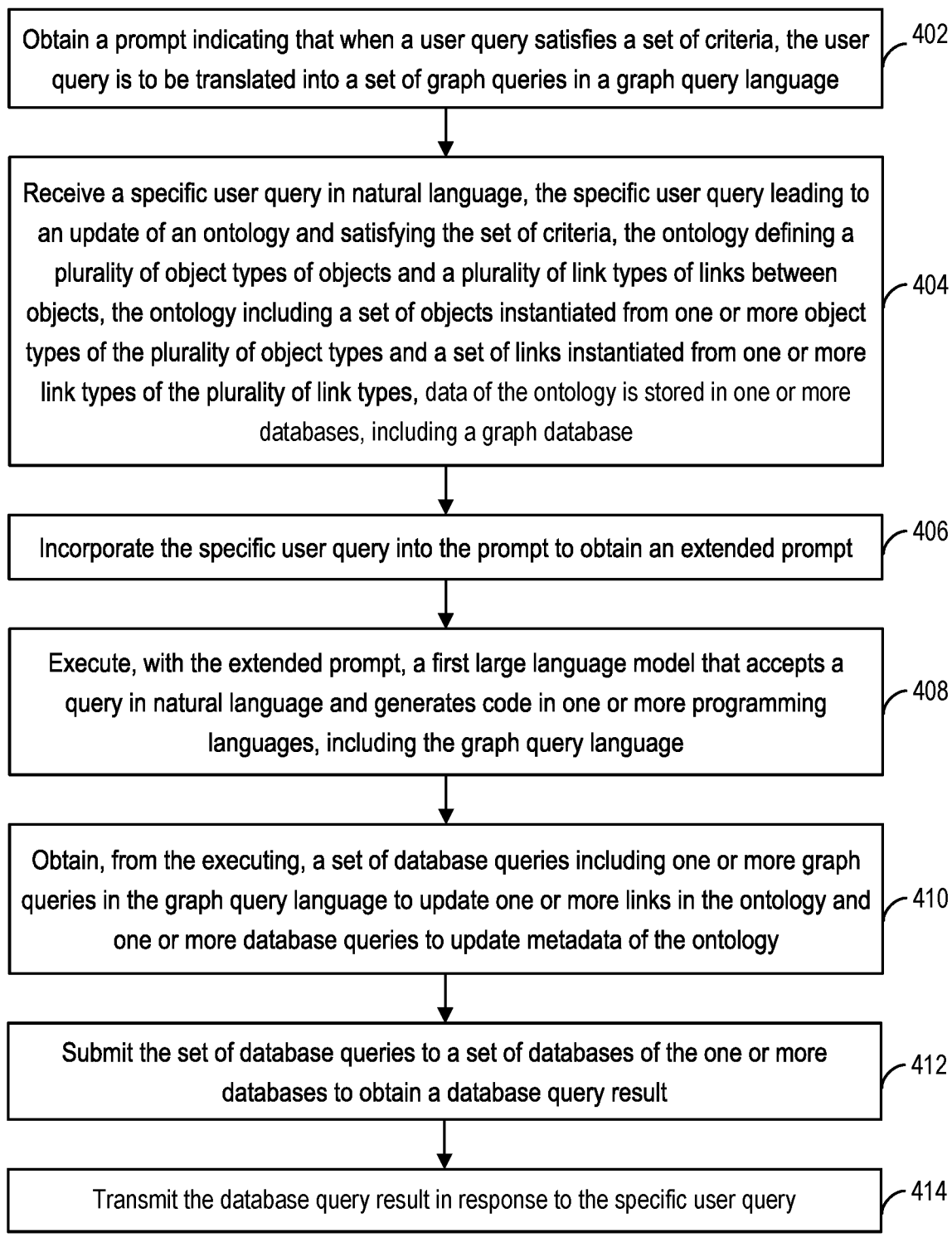
FIG. 4 illustrates an example process of processing queries of ontology-based databases in accordance with disclosed embodiments.

FIG. 4 illustrates an example process of FIG. 4 illustrates an example process of processing queries of ontology-based databases in accordance with disclosed embodiments. in accordance with some embodiments described herein. FIG. 4 is shown in simplified, schematic format for purposes of illustrating a clear example and other embodiments may include more, fewer, or different elements connected in various manners. FIG. 4 is intended to disclose an algorithm, plan, or outline that can be used to implement one or more computer programs or other software elements which when executed cause performing the functional improvements and technical advances that are described herein. Furthermore, the flow diagrams herein are described at the same level of detail that persons of ordinary skill in the art ordinarily use to communicate with one another about algorithms, plans, or specifications forming a basis of software programs that they plan to code or implement using their accumulated skill and knowledge.

In step 402, the server 102 is programmed or configured to obtaining a prompt indicating that when a user query satisfies a set of criteria, the user query is to be translated into a set of graph queries in a graph query language.

In certain embodiment, the prompt further includes an example of the user query that satisfies the set of criteria. In other embodiments, the set of criteria to be interpreted by the first LLM includes being related to optimizing a route, traversing multiple links at a time, examining links in aggregate across many different objects, or looking for complex connections, paths, networks, or quantities computed over such entities, or mentioning "connections", "paths", or "networks".

In step 404, the server 102 is programmed or configured to receive a specific user query in natural language, the specific user query leading to an update of an ontology and satisfying the set of criteria, the ontology defining a plurality of object types of objects and a plurality of link types of links between objects, the ontology including a set of objects instantiated from one or more object types of the plurality of object types and a set of links instantiated from one or more link types of the plurality of link types, and data of the ontology is stored in one or more databases, including a graph database.

In some embodiments, the one or more databases further include a relational database, and the one or more programming languages include a relational query language. In certain embodiments, the server 102 is programmed or configured to obtain a training dataset having a certain plurality of examples, each example indicating translating a certain user query in natural language to a certain graph query in the graph query language and translating the certain user query to a certain relational query in the relational query language. The server 102 is further programmed to retrain a second LLM that accepts a query in natural language and generates code in a set of programming languages with the training dataset to obtain the first LLM. In other embodiments, the prompt further indicates that when a second user query satisfies a second set of criteria, the second user query is to be translated into a set of relational queries in the relational query language. In yet other embodiments, the set of objects or pieces of the metadata is stored as records in the relational database.

In step 406, the server 102 is programmed or configured to incorporate the specific user query into the prompt to obtain an extended prompt.

In step 408, the server 102 is programmed or configured to execute, with the extended prompt, a first LLM that accepts a query in natural language and generates code in one or more programming languages, including the graph query language.

In step 410, the server 102 is programmed or configured to obtain, from the executing, a set of database queries including one or more graph queries in the graph query language to update one or more links in the ontology and one or more database queries to update metadata of the ontology.

In certain embodiments, the metadata of the ontology includes an index, an ontology map, or a running report of ontology statistics.

In step 412, the server 102 is programmed or configured to submit the set of database queries to a set of databases of the one or more databases to obtain a database query result.

In step 414, the server 102 is programmed or configured to transmit the database query result in response to the specific user query.

In certain embodiments, the database query result includes graph data from the graph database, and the transmitting comprises causing a graphical user interface (GUI) to display a graph based on the graph data. In other embodiments, the server 102 is programmed or configured to receive via the GUI a selection of a node or an edge of the graph, cause the GUI to display a value associated with the node or the edge, and receive a second user query including the value.

In some embodiments, the server 102 is programmed or configured to receive a second user query in natural language, the second user query satisfying the set of criteria, and incorporate the second user query into the prompt to obtain a second extended prompt. The server 102 is further programmed to execute the first LLM, with the second extended prompt and obtain a second set of database queries including one or more second graph queries in the graph query language to update one or more second links in the ontology.

In certain embodiments, the server 102 is programmed or configured to obtain a training dataset having a certain plurality of examples, each example indicating translating a certain user query in natural language to a certain function call to an application programming interface (API) of the ontology, and retrain a second LLM that accepts a particular query in natural language and generates code in a set of programming languages with the training dataset to obtain a new LLM. The server 102 is further programmed to receive a new user query in natural language, the new user query leading to a particular update of the ontology. In addition, the server 102 is programmed to execute the new LLM with the new user query, obtain a set of function calls to the API of the ontology, and execute the set of functional calls.

5. Example Implementation

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 5:
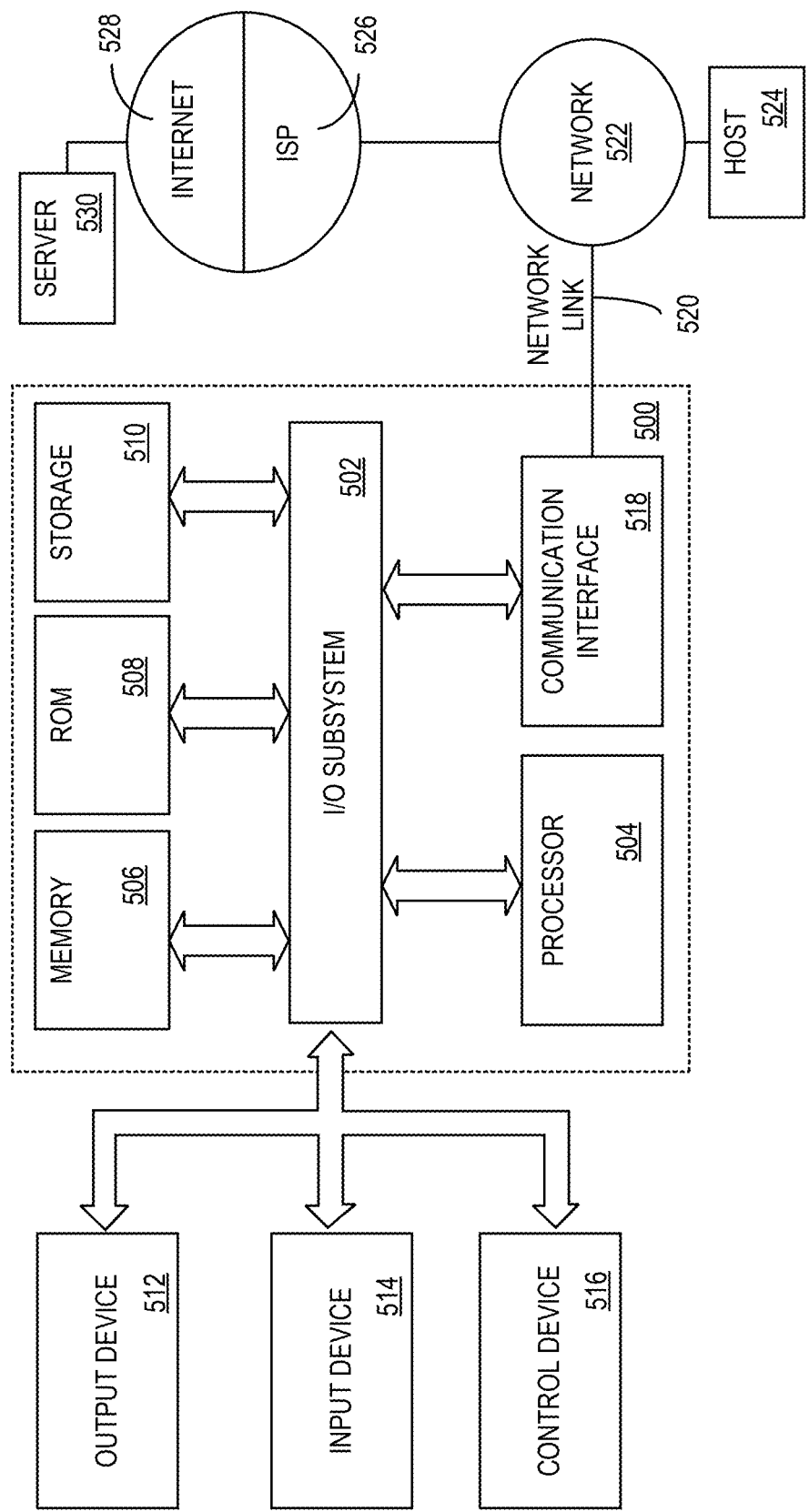
FIG. 5 illustrates a computer system upon which various embodiments may be implemented.

FIG. 5 is a block diagram that illustrates an example computer system with which an embodiment may be implemented. In the example of FIG. 5, a computer system 500 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 500 includes an input/output (I/O) subsystem 502 which may include a bus and/or other communication mechanism(s) for communicating information and/or instructions between the components of the computer system 500 over electronic signal paths. The I/O subsystem 502 may include an I/O controller, a memory controller and at least one I/O port. The electronic signal paths are represented schematically in the drawings, for example as lines, unidirectional arrows, or bidirectional arrows.

At least one hardware processor 504 is coupled to I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor or Advanced RISC Machines (ARM) processor.

Processor 504 may comprise an integrated arithmetic logic unit (ALU) or may be coupled to a separate ALU.

Computer system 500 includes one or more units of memory 506, such as a main memory, which is coupled to I/O subsystem 502 for electronically digitally storing data and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, can render computer system 500 into a special-purpose machine that is customized to perform the operations specified in the instructions.

Computer system 500 further includes non-volatile memory such as read only memory (ROM) 508 or other static storage device coupled to I/O subsystem 502 for storing information and instructions for processor 504. The ROM 508 may include various forms of programmable ROM (PROM) such as erasable PROM (EPROM) or electrically erasable PROM (EEPROM). A unit of persistent storage 510 may include various forms of non-volatile RAM (NVRAM), such as flash memory, or solid-state storage, magnetic disk, or optical disk such as CD-ROM or DVD-ROM, and may be coupled to I/O subsystem 502 for storing information and instructions. Storage 510 is an example of a non-transitory computer-readable medium that may be used to store instructions and data which when executed by the processor 504 cause performing computer-implemented methods to execute the techniques herein.

The instructions in memory 506, ROM 508 or storage 510 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement Transmission Control Protocol/Internet Protocol (TCP/IP), Hypertext Transfer Protocol (HTTP) or other communication protocols; file processing instructions to interpret and render files coded using HTML, XML, Joint Photographic Experts Group (JPEG), Moving Picture Experts Group (MPEG) or Portable Network Graphics (PNG); user interface instructions to render or interpret commands for a GUI, command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using SQL or NoSQL, an object store, a graph database, a flat file system or other data storage.

Computer system 500 may be coupled via I/O subsystem 502 to at least one output device 512. In one embodiment, output device 512 is a digital computer display. Examples of a display that may be used in various embodiments include a touch screen display or a light-emitting diode (LED) display or a liquid crystal display (LCD) or an e-paper display. Computer system 500 may include other type(s) of output devices 512, alternatively or in addition to a display device. Examples of other output devices 512 include printers, ticket printers, plotters, projectors, sound cards or video cards, speakers, buzzers or piezoelectric devices or other audible devices, lamps or LED or LCD indicators, haptic devices, actuators, or servos.

At least one input device 514 is coupled to I/O subsystem 502 for communicating signals, data, command selections or gestures to processor 504. Examples of input devices 514 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be a touchpad, a mouse, a trackball, or cursor direction keys for communicating direction information and command selections to processor 504 and for controlling cursor movement on the output device 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

In another embodiment, computer system 500 may comprise an internet of things (IoT) device in which one or more of the output device 512, input device 514, and control device 516 are omitted. Or, in such an embodiment, the input device 514 may comprise one or more cameras, motion detectors, thermometers, microphones, seismic detectors, other sensors or detectors, measurement devices or encoders and the output device 512 may comprise a special-purpose display such as a single-line LED or LCD display, one or more indicators, a display panel, a meter, a valve, a solenoid, an actuator or a servo.

When computer system 500 is a mobile computing device, input device 514 may comprise a global positioning system (GPS) receiver coupled to a GPS module that is capable of triangulating to a plurality of GPS satellites, determining and generating geo-location or position data such as latitude-longitude values for a geophysical location of the computer system 500. Output device 512 may include hardware, software, firmware, and interfaces for generating position reporting packets, notifications, pulse or heartbeat signals, or other recurring data transmissions that specify a position of the computer system 500, alone or in combination with other application-specific data, directed toward host computer 524 or server 530.

Computer system 500 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 500 in response to processor 504 executing at least one sequence of at least one instruction contained in main memory 506. Such instructions may be read into main memory 506 from another storage medium, such as storage 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media may be involved in carrying at least one sequence of at least one instruction to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage 510 either before or after execution by processor 504.

Computer system 500 also includes a communication interface 518 coupled to I/O subsystem 502. Communication interface 518 provides a two-way data communication coupling to network link(s) 520 that are directly or indirectly connected to at least one communication network, such as a network 522 or a public or private cloud on the Internet. For example, communication interface 518 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 522 broadly represents a LAN, WAN, campus network, internetwork, or any combination thereof. Communication interface 518 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 518 sends and receives electrical, electromagnetic, or optical signals over signal paths that carry digital data streams representing various types of information.

Network link 520 typically provides electrical, electromagnetic, or optical data communication directly or through at least one network to other data devices, using, for example, satellite, cellular, Wi-Fi, or BLUETOOTH technology. For example, network link 520 may provide a connection through a network 522 to a host computer 524.

Furthermore, network link 520 may provide a connection through network 522 or to other computing devices via internetworking devices and/or computers that are operated by an Internet Service Provider (ISP) 526. ISP 526 provides data communication services through a world-wide packet data communication network represented as internet 528. A server 530 may be coupled to internet 528. Server 530 broadly represents any computer, data center, virtual machine, or virtual computing instance with or without a hypervisor, or computer executing a containerized program system such as DOCKER or KUBERNETES. Server 530 may represent an electronic digital service that is implemented using more than one computer or instance and that is accessed and used by transmitting web services requests, Uniform Resource Locator (URL) strings with parameters in HTTP payloads, API calls, app services calls, or other service calls. Computer system 500 and server 530 may form elements of a distributed computing system that includes other computers, a processing cluster, server farm or other organization of computers that cooperate to perform tasks or execute applications or services. Server 530 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to interpret or render files coded using HTML, XML, JPEG, MPEG or PNG; user interface instructions to render or interpret commands for a GUI, command-line interface or text user interface; application software such as an office suite, internet access applications, design and manufacturing applications, graphics applications, audio applications, software engineering applications, educational applications, games or miscellaneous applications. Server 530 may comprise a web application server that hosts a presentation layer, application layer and data storage layer such as a relational database system using structured query language (SQL) or NoSQL, an object store, a graph database, a flat file system or other data storage.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage 510, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 504. While each processor 504 or core of the processor executes a single task at a time, computer system 500 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

6. Extensions and Alternatives

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A method of processing queries of ontology-based databases, comprising:
    obtaining a prompt indicating that when a user query satisfies a set of criteria, the user query is to be translated into a set of graph queries in a graph query language;
    receiving a specific user query in natural language,
    the specific user query leading to an update of an ontology and satisfying the set of criteria,
    the ontology defining a plurality of object types of objects and a plurality of link types of links between objects,
    the ontology including a set of objects instantiated from one or more object types of the plurality of object types and a set of links instantiated from one or more link types of the plurality of link types,
    data of the ontology being stored in one or more databases, including a graph database;
    incorporating the specific user query into the prompt to obtain an extended prompt;
    executing, with the extended prompt, a first large language model (LLM) that accepts a query in natural language and generates code in one or more programming languages, including the graph query language;
    obtaining, from the executing, a set of database queries including one or more graph queries in the graph query language to update one or more links in the ontology and one or more database queries to update metadata of the ontology;
    submitting the set of database queries to a set of databases of the one or more databases to obtain a database query result;
    transmitting the database query result in response to the specific user query,
    wherein the method is performed by one or more processors.

2. The method of claim 1,
    the one or more databases further including a relational database,
    the one or more programming languages including a relational query language.

3. The method of claim 2, further comprising:
    obtaining a training dataset having a certain plurality of examples, each example indicating translating a certain user query in natural language to a certain graph query in the graph query language and translating the certain user query to a certain relational query in the relational query language;
    retraining a second LLM that accepts a query in natural language and generates code in a set of programming languages with the training dataset to obtain the first LLM.

4. The method of claim 2, the prompt further indicating that when a second user query satisfies a second set of criteria, the second user query is to be translated into a set of relational queries in the relational query language.

5. The method of claim 2, the set of objects or pieces of the metadata being stored as records in the relational database.

6. The method of claim 1, the prompt further including an example of the user query that satisfies the set of criteria.

7. The method of claim 1, the set of criteria to be interpreted by the first LLM including being related to optimizing a route, traversing multiple links at a time, examining links in aggregate across many different objects, or looking for complex connections, paths, networks, or quantities computed over such entities, or mentioning "connections", "paths", or "networks".

8. The method of claim 1, the metadata of the ontology including an index, an ontology map, or a running report of ontology statistics.

9. The method of claim 1,
    the database query result including graph data from the graph database,
    the transmitting comprising causing a graphical user interface (GUI) to display a graph based on the graph data.

10. The method of claim 9, further comprising:
    receiving via the GUI a selection of a node or an edge of the graph;
    causing the GUI to display a value associated with the node or the edge;
    receiving a second user query including the value.

11. The method of claim 1, further comprising:
    receiving a second user query in natural language,
    the second user query satisfying the set of criteria,
    incorporating the second user query into the prompt to obtain a second extended prompt;
    executing the first LLM, with the second extended prompt;

obtaining a second set of database queries including one or more second graph queries in the graph query language to update one or more second links in the ontology.

12. The method of claim 1, further comprising:
obtaining a training dataset having a certain plurality of examples, each example indicating translating a certain user query in natural language to a certain function call to an application programming interface (API) of the ontology;
retraining a second LLM that accepts a particular query in natural language and generates code in a set of programming languages with the training dataset to obtain a new LLM;
receiving a new user query in natural language,
the new user query leading to a particular update of the ontology;
executing the new LLM with the new user query;
obtaining a set of function calls to the API of the ontology;
executing the set of function calls.

13. A system for processing queries of ontology-based databases, comprising:
a memory;
one or more processors coupled to the memory and configured to perform:
obtaining a prompt indicating that when a user query satisfies a set of criteria, the user query is to be translated into a set of graph queries in a graph query language;
receiving a specific user query in natural language,
the specific user query leading to an update of an ontology and satisfying the set of criteria,
the ontology defining a plurality of object types of objects and a plurality of link types of links between objects,
the ontology including a set of objects instantiated from one or more object types of the plurality of object types and a set of links instantiated from one or more link types of the plurality of link types,
data of the ontology is stored in one or more databases, including a graph database;
incorporating the specific user query into the prompt to obtain an extended prompt;
executing, with the extended prompt, a first large language model (LLM) that accepts a query in natural language and generates code in one or more programming languages, including the graph query language;
obtaining, from the executing, a set of database queries including one or more graph queries in the graph query language to update one or more links in the ontology and one or more database queries to update metadata of the ontology;
submitting the set of database queries to a set of databases of the one or more databases to obtain a database query result;
transmitting the database query result in response to the specific user query.

14. The system of claim 13,
the one or more databases further including a relational database,
the one or more programming languages including a relational query language.

15. The system of claim 14, the prompt further indicating that when a second user query satisfies a second set of criteria, the second user query is to be translated into a set of relational queries in the relational query language.

16. The system of claim 13, the prompt further including an example of the user query that satisfies the set of criteria.

17. The system of claim 13, the set of criteria to be interpreted by the first LLM including being related to optimizing a route, traversing multiple links at a time, examining links in aggregate across many different objects, or looking for complex connections, paths, networks, or quantities computed over such entities, or mentioning "connections", "paths", or "networks".

18. The system of claim 13, the metadata of the ontology including an index, an ontology map, or a running report of ontology statistics.

19. The system of claim 13, the one or more processors further configured to perform:
obtaining a training dataset having a certain plurality of examples, each example indicating translating a certain user query in natural language to a certain function call to an application programming interface (API) of the ontology;
retraining a second LLM that accepts a particular query in natural language and generates code in a set of programming languages with the training dataset to obtain a new LLM;
receiving a new user query in natural language,
the new user query leading to a particular update of the ontology;
executing the new LLM with the new user query;
obtaining a set of function calls to the API of the ontology;
executing the set of function calls.

20. A non-transitory, computer-readable storage medium storing one or more sequences of instructions which when executed cause one or more processors to perform:
obtaining a prompt indicating that when a user query satisfies a set of criteria, the user query is to be translated into a set of graph queries in a graph query language;
receiving a specific user query in natural language,
the specific user query leading to an update of an ontology and satisfying the set of criteria,
the ontology defining a plurality of object types of objects and a plurality of link types of links between objects,
the ontology including a set of objects instantiated from one or more object types of the plurality of object types and a set of links instantiated from one or more link types of the plurality of link types,
data of the ontology is stored in one or more databases, including a graph database;
incorporating the specific user query into the prompt to obtain an extended prompt;
executing, with the extended prompt, a first large language model (LLM) that accepts a query in natural language and generates code in one or more programming languages, including the graph query language;
obtaining, from the executing, a set of database queries including one or more graph queries in the graph query language to update one or more links in the ontology and one or more database queries to update metadata of the ontology;
submitting the set of database queries to a set of databases of the one or more databases to obtain a database query result;
transmitting the database query result in response to the specific user query.

* * * * *